Nov. 30, 1965     R. G. ALTHERR ETAL     3,220,717
SPRING ASSEMBLY
Filed May 25, 1964
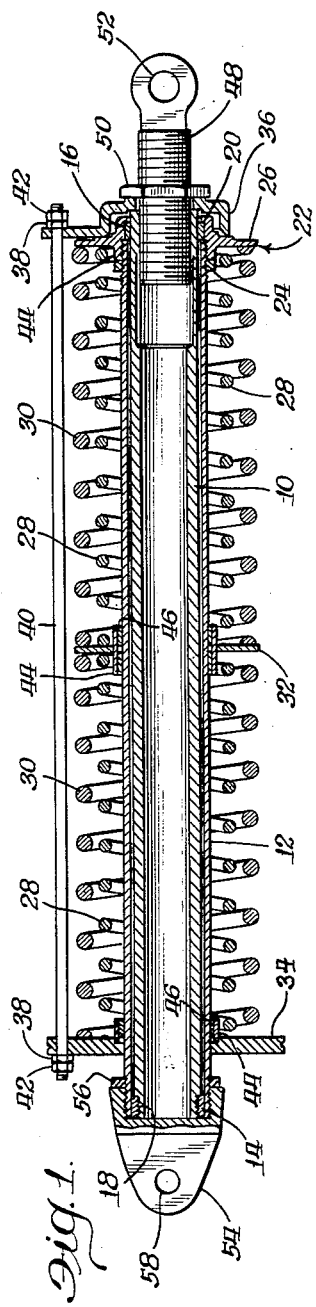
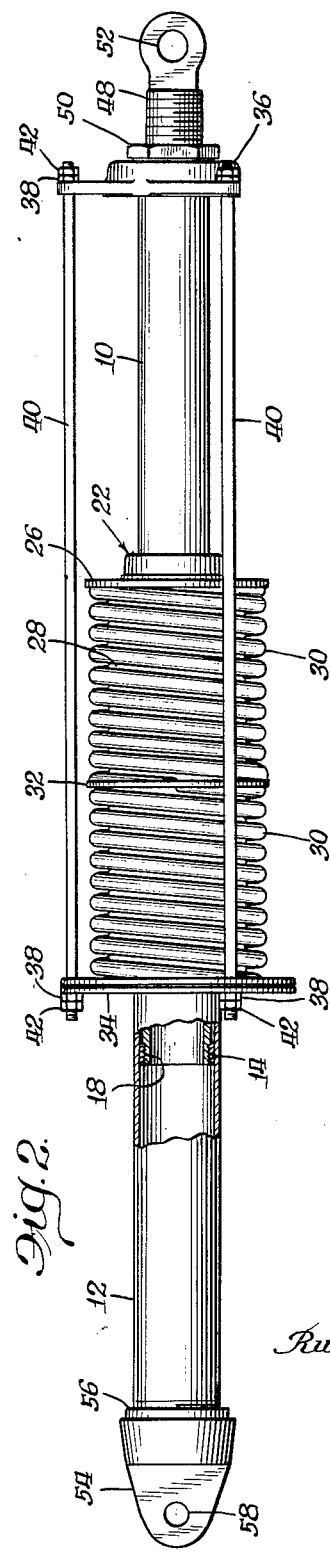
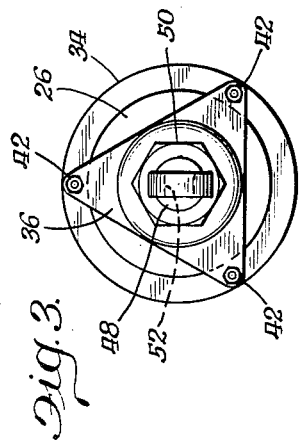
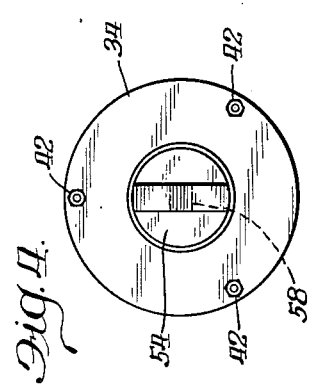
Inventors:
Russell G. Altherr
John E. Silvis
Donald J. Zach
BY Walter L. Schlegel Jr.
Atty.

United States Patent Office 3,220,717
Patented Nov. 30, 1965

3,220,717
SPRING ASSEMBLY
Russell G. Altherr, Munster, Ind., and John E. Silvis, Homewood, and Donald J. Zach, Park Forest, Ill., assignors to Amsted Industries Incorporated, Chicago, Ill., a corporation of New Jersey
Filed May 25, 1964, Ser. No. 369,937
5 Claims. (Cl. 267—70)

This invention relates to a spring assembly. The spring assembly of this invention is especially useful as a cable tensioner.

Spring assemblies of various designs have been used for tensioning cables. In some instances, it is desired that the spring assembly produce a closely toleranced load which can be adjusted and verified while the cable tensioner is in use. This invention is based on such a tensioner.

Briefly, the spring assembly of this invention comprises rigid, inner and outer telescoping tubes coaxially passing through one or more helical compression springs to offer resistance to the bending of the springs due to lateral static or dynamic loading thereof. The spring (or springs) is seated between two radially-extending retainers, each of the retainers being mounted in a fixed position with respect to one of the tubes so that the spring (or springs) biases the tubes to a telescoped position. Suitable means are provided at opposite ends of the two stabilizer tubes for securing the assembly between two cable ends.

It is, therefore, the primary object of this invention to provide a spring assembly comprising one or more helical compression springs axially mounted about a pair of telescoping stabilizer tubes.

Another object of this invention is to provide a spring assembly that will produce a closely toleranced load.

Still another object of this invention is to provide a spring assembly which includes means for adjusting the load produced thereby.

A further object of this invention is to provide a spring assembly with means for verifying the load produced thereby while the assembly is in use.

A still further object of this invention is to provide a spring assembly for producing a load between two points with means for adjusting the distance between the points without varying the load produced by the assembly.

These and further objects of this invention will become apparent or be described as the description thereof herein proceeds, the reference is made to the accompanying drawings in which:

FIGURE 1 is a side elevation, partly in section, of a spring assembly embodying this invention;

FIGURE 2 is a side elevation, partly in section, of the spring assembly of FIGURE 1 under load;

FIGURE 3 is an end elevation taken from the right as seen in FIGURES 1 and 2; and FIGURE 4 is an elevation taken from the left as seen in FIGURES 1 and 2.

This invention is best described by reference to FIGURES 1 to 4 wherein the reference numerals 10 and 12 designate inner and outer, rigid, telescoping, stabilizer tubes. The external diameter of inner stabilizer tube 10 and internal diameter of outer stabilizer tube 12 are adjusted so as to form an annular space between the tubes when they are telescoped. This spacing prevents the opposing cylindrical surfaces of tubes 10 and 12 from wearing on one another. Bushings 14 and 16, which are fabricated of a highly wear-resistant organo-plastic material such as nylon or "Teflon," maintain tubes 10 and 12 coaxial. Bushing 14 is secured about an end of inner stabilizer tube 10 by threads 18, while bushing 16 is held in place against the end of outer stabilizer tube 12 by inner lip 20 on end plate or abutment 22. End plate 22 is threaded on the end of outer tube 12 and is rigidly held in place by lock nut 24.

Extending about the exterior of outer stabilizer tube 12 is a compression spring means hereinafter described which bears at one end against radial wall 26 of end plate 22. In the illustrated embodiment, the spring means is comprised of two substantially identical sets of springs in end-to-end relationship, each of said sets being comprised of coaxial inner spring 28 and outer spring 30, which is preferably of the same length as spring 30. The two sets of springs are separated from each other by center plate or abutment 32 slideably mounted about the outer tube 12. The end of the axially aligned sets of compression springs remote from end plate 22 abuts against inner plate or abutment 34, which is mounted in a fixed position with respect to inner tube 10 as hereinafter described. Inner plate 34 is secured to end fitting 36 by nuts 42 and jam nuts 38 engaging the thread ends of rigid rods 40 which extend through aligned apertures in inner plate 34 and end fitting 36. It will be noted that the springs in a fully compressed state will prevent the movement of inner tube 10 with respect to outer tube 12 beyond a certain point in one direction. On the other hand, the movement of inner tube 10 with respect to outer tube 12 in the opposite direction will be prevented by end plate 22 abutting against end fitting 36.

If desired, the ends of both of the inner springs 28 and outer springs 30 are tapered and squared for flat engagement against end plate 22, center plate 32 and inner plate 34. It is preferred that plates 22, 32 and 34 be fixed to or integral with the respective tubular portions 44 extending a short distance between outer tube 12 and inner springs 28. Bushings 46 fabricated of a wear-resistant material such as nylon are provided on the inner surfaces of tubular portions 44 on plates 32 and 34 to facilitate the movement of these plates with respect to outer tube 12. All of the bushings provide a snug slideable fit between the components of the assembly separated thereby to create a rigid assembly.

End fitting 36 has an axial aperture aligned with the central passageway of inner tube 10. Extending through the aperture in end fitting 36 is adjusting screw 48 which is threadably secured to the interior of inner tube 10. Lock nut 50 serves to lock adjusting screw 48 in the threaded position as well as to hold end fitting 36 in place against the end of inner tube 10. Adjusting screw is provided with aperture 52, as for securing a cable to that end of the assembly. Threaded on the external threads provided in the end of outer tube 12 remote from the plate 22 is end fitting 54, which is held in place by lock nut 56. End fitting 54 is also provided with cable-engaging aperture 58.

The length of the assembly, i.e., the distance between apertures 52 and 58, may be adjusted while the assembly is under load (as shown in FIGURE 2) by loosening lock nut 50, using a spanner wrench to rotate inner stabilizer tube 10 with respect to adjusting screw 48 until the desired distance between apertures 52 and 58 is obtained, and then retightening lock nut 50. The load produced by the spring assembly may be varied within limits (depending upon the spring or springs used) by adjusting nuts 42 to change the spacing between end plate 22 and inner plate 34. If it is desired to verify the load produced by the assembly while it is in use, calibration markings spaced a known distance are provided on the peripheral edge of inner plate 34 and end fitting 54 when the load is adjusted as hereinbefore described. The load can then be verified, even while the assembly is in use, by checking the distance between the calibration markings.

Although the spring assembly of this invention has been described with respect to a specific embodiment, it will be apparent that obvious modifications may be made by one skilled in the art without departing from the intended scope of this invention as defined by the appended claims. For example, while members 10 and 12 are illustrated as being tubular members having opposing cylindrical surfaces it will be apparent that the inner member 10 may be solid and/or that members 10 and 12 may have opposing surfaces which are other than cylindrical, such as hexagonal, octagonal, etc. However, fabrication of the assembly with members 10 and 12 having cylindrical surfaces permits the length adjustment as hereinbefore described while the assembly is in use. It will also be apparent that spring configurations other than that illustrated (two sets of two concentric springs) may be utilized. For example, the spring assembly may include merely one helical compression spring axially disposed about outer tube 12 and bearing against end plate 22 and inner plate 34, two axially aligned compression springs rather than two sets of springs, one set of inner and outer helical compression springs, and the like.

We claim:

1. A spring assembly comprising a rigid tube member, a rigid elongated member within the tube member and having a snug slideable fit within the ends of the tube member, a first abutment surrounding the tube member and having a snug slideable fit thereon between its ends, an end plate bearing against one end of the elongated member, a second abutment fixed on one end of the tube member, spring means compressed between the abutments for urging the second abutment against the plate, adjustable means connecting the plate to the first abutment for adjusting the load of said spring means, a connector mounted on the other end of said tube member, another connector, means connecting said other connector to said elongated member comprising a screw threaded into the end thereof remote from the first connector for adjusting the distance between the connectors while the spring means are under load, and lock nut means threaded on said screw for clamping said end plate against said end of the elongated member.

2. A spring assembly comprising a rigid tube, a rigid elongated member within said tube and having a snug slideable fit within the ends of said tube, three annular abutments including first and second end abutments and a center abutment axially aligned about the exterior of said tube, said first abutment fixed on an end of said tube, a retaining plate bearing against an end of said elongated member, said first end abutment and said retaining plate being at corresponding ends of said tube and said elongated member, said second end abutment and said center abutment each having a snug slideable fit on said tube between the ends thereof, helical compression spring means concentric with said tube seated between said center abutment and each of said end abutments, adjustable means connecting said second end abutment and said retaining plate for adjusting the distance between said second end abutment and said retaining plate so as to adjust the load of said spring means, first connector means mounted on the end of said tube remote from said first end abutment, second connector means at the end of said elongated member remote from said first connector means, said second connector means being connected to said elongated member by a screw threaded to said elongated member for adjusting the distance between said connector means while said spring means are under load, and lock nut means threaded on said screw for clamping said retaining plate against said elongated member.

3. A spring assembly comprising inner and outer, rigid, telescoping tubes of cylindrical cross-section, said inner tube having a snug slideable fit within the ends of said outer tube, three annular abutments including first and second end abutments and a center abutment axially aligned about the exterior of said outer tube, said first end abutment fixed on an end of said outer tube, a retaining plate bearing against an end of said inner tube, said first end abutment and said retaining plate being at corresponding ends of said tubes, said second end abutment and said center abutment each having a snug slideable fit on said outer tube between the ends thereof, helical compression spring means concentric with said tubes compressed between said center abutment and each of said end abutments for urging said first end abutment against said retaining plate, a plurality of spaced rods located around said spring means and said center abutment, said rods connecting said retaining plate to said second end abutment and including means for adjusting the load of said spring means, first connector means mounted on the end of said outer tube remote from said first end abutment, second connector means at the end of said inner tube remote from said first connector means, said second connector means being connected to said inner tube by a screw threaded into said inner tube for adjusting the distance between said connector means while said spring means are under load, and lock nut means threaded on said screw for clamping said retaining plate against said inner tube.

4. A spring assembly comprising a rigid tube, a rigid elongated member slideably mounted within said tube, a first abutment surrounding said tube and being slideable between the ends of said tube, an end plate bearing against one end of said elongated member, a second abutment fixed on one end of said tube, spring means compressed between said abutments for urging said second abutment against said end plate, adjustable means connecting said end plate to said first abutment for adjusting the load of said spring means, a connector mounted on the other end of said tube, another connector mounted on the end of said elongated member remote from said first connector, and means for adjusting the distance between said connectors while said spring means is under load.

5. A spring assembly comprising a rigid tube, a rigid elongated member slideably mounted within said tube, a first abutment surrounding said tube and being slideable between the ends of said tube, a second abutment and an end plate being located at corresponding ends of said tube and elongated member, respectively, said second abutment being between said first abutment and end plate, spring means compressed between said abutments for urging said second abutment against said end plate, adjustable means connecting said end plate to said first abutment for adjusting the load of said spring means, a connector mounted on the end of said tube remote from said second abutment, another connector mounted on the end of said elongated member remote from said first connector, and means for adjusting the distance between said connectors while said spring means is under load.

References Cited by the Examiner

UNITED STATES PATENTS

| 576,543 | 2/1897 | Burr | 267—70 |
|---|---|---|---|
| 624,327 | 5/1899 | Hammond | 267—70 |
| 2,033,035 | 3/1936 | Koons | 267—1 |
| 2,125,303 | 8/1938 | McRoberts | 267—72 |
| 2,164,709 | 7/1939 | Hall et al. | 267—70 |
| 2,914,960 | 12/1959 | Edgerton | 267—70 |

FOREIGN PATENTS

| 8,760 | 1886 | Great Britain. |
|---|---|---|

ARTHUR L. LA POINT, *Primary Examiner.*

EUGENE G. BOTZ, *Examiner.*